United States Patent
F. Aranha

(10) Patent No.: US 10,855,468 B2
(45) Date of Patent: Dec. 1, 2020

(54) SYSTEM AND METHOD FOR EFFICIENT IMPLEMENTATION OF PRIME FIELD ARITHMETIC IN ARM PROCESSORS

(71) Applicants: LG Electronics Inc., Seoul (KR); UNICAMP, São Paulo (BR)

(72) Inventor: Diego F. Aranha, São Paulo (BR)

(73) Assignees: LG Electronics, Inc., Seoul (KR); UNICAMP, Sao Paulo (BR)

(*) Notice: Subject to any disclaimer, the term of this patent is extended or adjusted under 35 U.S.C. 154(b) by 127 days.

(21) Appl. No.: 16/300,005

(22) PCT Filed: May 12, 2017

(86) PCT No.: PCT/KR2017/004978
§ 371 (c)(1),
(2) Date: Nov. 8, 2018

(87) PCT Pub. No.: WO2017/196144
PCT Pub. Date: Nov. 16, 2017

(65) Prior Publication Data
US 2019/0158284 A1    May 23, 2019

Related U.S. Application Data

(60) Provisional application No. 62/335,649, filed on May 12, 2016.

(51) Int. Cl.
*H04L 29/06* (2006.01)
*H04L 9/30* (2006.01)
(Continued)

(52) U.S. Cl.
CPC ............ *H04L 9/3066* (2013.01); *G06F 17/16* (2013.01); *G09C 1/00* (2013.01); *H04L 9/002* (2013.01);
(Continued)

(58) Field of Classification Search
CPC . H04L 63/04; H04L 63/0428; H04L 63/0435; H04L 63/0442; H04L 63/045;
(Continued)

(56) References Cited

U.S. PATENT DOCUMENTS 7,650,374 B1    1/2010  Gura et al.
2005/0268092 A1*  12/2005  Shankar ............... G06F 21/575
                                                        713/164
(Continued)

FOREIGN PATENT DOCUMENTS

WO    2013044276 A1    4/2013

OTHER PUBLICATIONS

Zhe Liu et al., "A Synthesis of Multi-Precision Multiplication and Squaring Techniques for 8-Bit Sensor Nodes: State-of-the-Art Research and Future Challenges," Journal of Computer Science and Technology 31(2), Mar. 2016, See sections 2-6.4.
Michael Hutter et al., "Fast multi-precision multiplication for public-key cryptography on embedded microprocessors," CHES 2011; LNCS 6917, pp. 459-474, 2011, See sections 3-3.4.
(Continued)

*Primary Examiner* — Edward Zee
(74) *Attorney, Agent, or Firm* — Duane Morris LLP

(57) ABSTRACT

The present invention provides a method for performing Elliptic Curve Cryptography (ECC) on data, the ECC implemented on multiple arithmetic layers. By performing multi-precision multiplication by implementing product-scanning to process columns of intermediary results in order to obtain a multiplication result by computing unsigned multiplication of data, accumulating a result of the multiplication and preserving a generated carry flag such that propagation of the carry flag is delayed, the present invention improves performance.

14 Claims, 3 Drawing Sheets

(51) Int. Cl.
*G06F 17/16* (2006.01)
*G09C 1/00* (2006.01)
*H04L 9/00* (2006.01)
*H04L 9/06* (2006.01)

(52) U.S. Cl.
CPC ............ H04L 9/0618 (2013.01); H04L 63/04 (2013.01); H04L 63/0428 (2013.01); H04L 63/0435 (2013.01); *H04L 2209/04* (2013.01); *H04L 2209/122* (2013.01); *H04L 2209/125* (2013.01)

(58) Field of Classification Search
CPC ..... H04L 63/0457; H04L 9/30; H04L 9/3066; H04L 9/3073; H04L 9/3006; H04L 9/14; H04L 9/002; H04L 9/003; H04L 9/004; H04L 9/005
See application file for complete search history.

(56) References Cited

U.S. PATENT DOCUMENTS

| | | |
|---|---|---|
| 2015/0180652 A1 | 6/2015 | Kocher et al. |
| 2016/0134417 A1* | 5/2016 | Houssain .............. H04L 9/3066 380/28 |

OTHER PUBLICATIONS

International Search Report and Written Opinion—PCT/KR2017/004978—ISA/KR—dated Aug. 8, 2017.
A. Langley et al., Internet Research Task Force (IRTF) Request for Comments: RFC 7748, Jan. 2016.
S. Josefsson et al., Internet Research Task Force (IRTF) Request for Comments: RFC 8032, Jan. 2017.
S. Blake-Wilson et al., Network Working Group Request for Comments: RFC 4492, May 2006.

* cited by examiner

[Fig. 1]
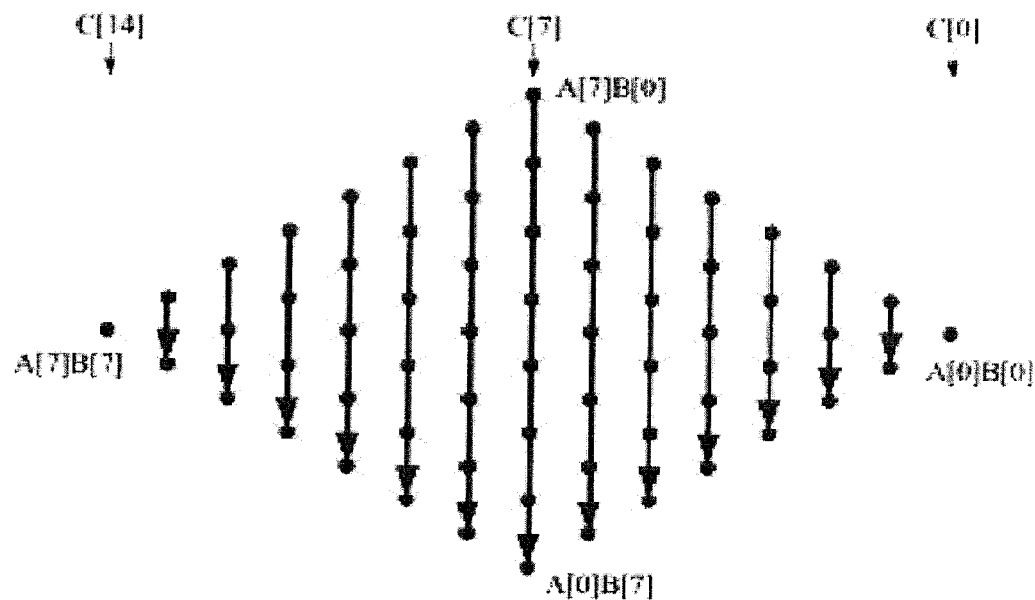
[Fig. 2]
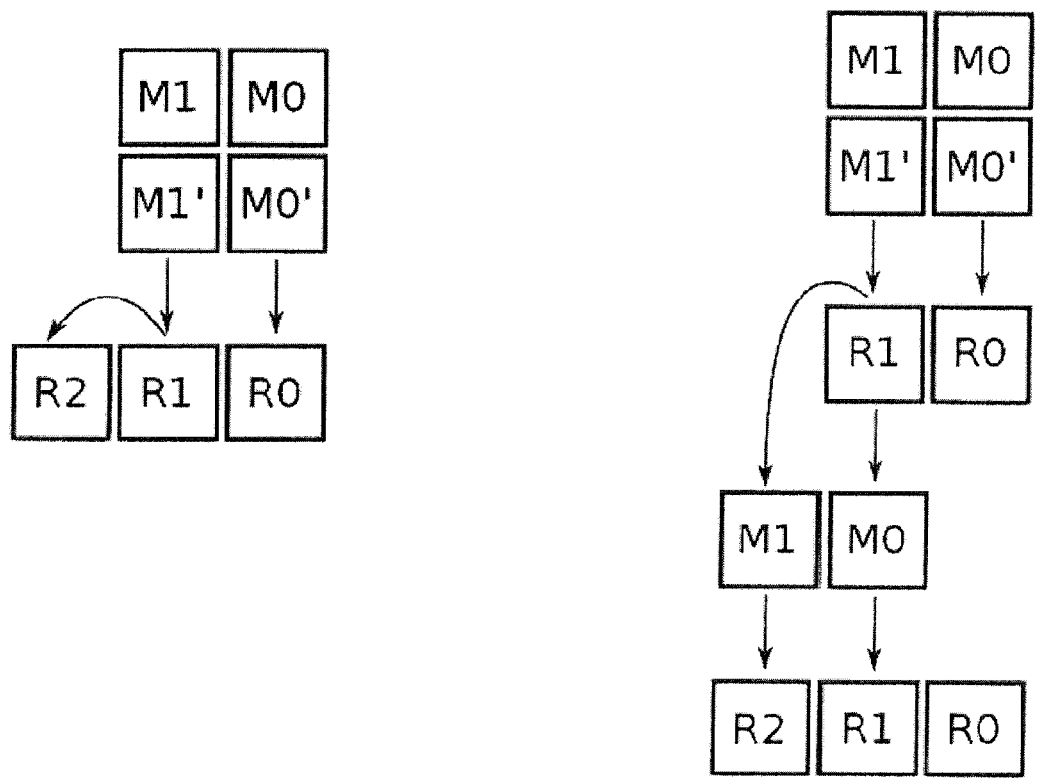

[Fig. 3]

```
# Read digits from first operand
LDR r3, [r1, #(4*0)]
LDR r4, [r1, #(4*1)]
LDR r5, [r1, #(4*2)]
# Read digits from second operand
LDR r7, [r2, #(4*0)]
LDR r8, [r2, #(4*1)]
LDR r9, [r2, #(4*2)]
# Compute and store first column
UMULL r10, r11, r3, r7
STR r10, [r0, #(4*0)]
# Reset auxiliary registers
MOV r10, #0
MOV r12, #0
MOV r14, #0
# Compute second column
UMLAL r11, r12, r3, r8
UMLAL r11, r14, r4, r7
# Accumulate, store and propagate carry
ADDS r12, r12, r14
ADC  r10, r10, #0
STR r11, [r0, #(4*1)]
```

```
# Read digits from operands
...
...
# Compute and store first column
...
# Reset auxiliary registers
...
# Compute second column
UMLAL r11, r12, r3, r8
UMLAL r11, r14, r4, r7
# Accumulate, store and delay carry
ADDS r12, r12, r14
STR r11, [r0, #(4*1)]

# Reset auxiliary registers
MOV r11, #0
MOV r14, #0
# Accumulate with previous delayed carry
UMLAL r12, r14, r3, r9
ADCS r10, r10, r14
ADC  r11, r11, #0
```

[Fig. 4]

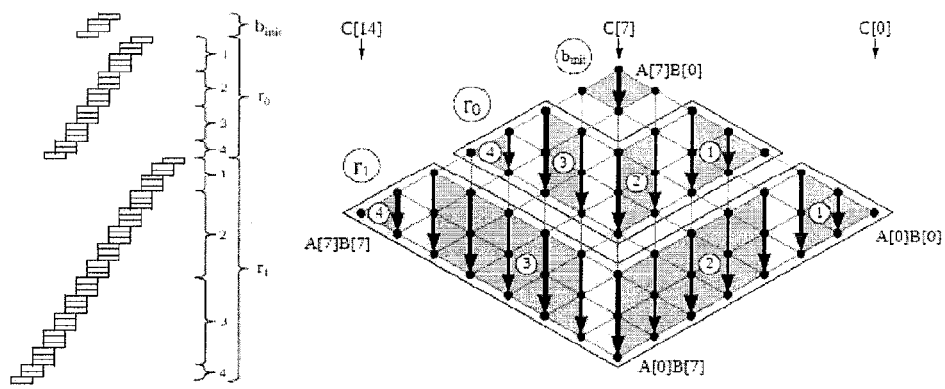

Fig. 4. Operand-caching multiplication of 8-word large integers $a$ and $b$ ($e = 3$)

[Fig. 5]
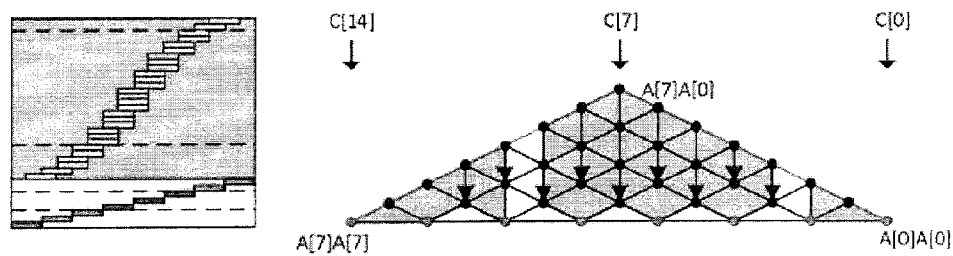
[Fig. 6]
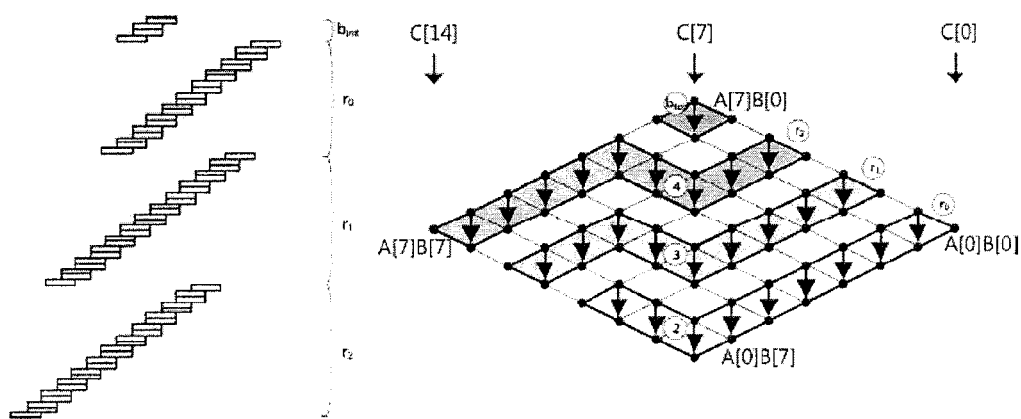

SYSTEM AND METHOD FOR EFFICIENT IMPLEMENTATION OF PRIME FIELD ARITHMETIC IN ARM PROCESSORS

TECHNICAL FIELD

The present invention relates to Cryptography, and specifically, to performing Elliptic Curve Cryptography (ECC) of data with the ECC implemented on multiple arithmetic layers.

BACKGROUND ART

The emergence of the Internet of Things (IoT) immediately raises concerns about the security of communications between IoT devices and even of the devices themselves. The fact that an extraordinary number of wirelessly networked devices will continuously store and exchange sensitive data has exposed a larger attack surface (ranging from physical exposure and ease of access to remote availability) and made practical, several attack scenarios that were only considered in the research literature.

While designing and developing secure efficient implementations of cryptography is not a new problem and has been an active area of research since the development of public-key cryptography, the emergence of IoT brings new challenges to this paradigm. In particular, special attention must be given to side-channel attacks, in which operational aspects of the implementation of a cryptographic algorithm may leak internal state information and allow an attacker to retrieve cryptography keys by only observing leakage through the communication channel, power consumption, execution time or radiation measurements.

Information leaked through cache latency or execution time already allows powerful timing attacks against naive implementations of symmetric and public-key cryptography, respectively. More intrusive attacks also attempt to inject faults at precise execution times, in hope of corrupting an execution state to reveal secret information.

Consequently, securely implementing cryptography in typical resource-constrained IoT devices is a challenging problem. Optimizing such implementations to strike a balance between resource efficiency and side-channel resistance further complicates the challenge leading to both algorithmic advances and novel implementation strategies. Protecting a modern IoT device involves the application of several cryptographic primitives.

Symmetric primitives, such as block and stream ciphers, can be used to encrypt data in bulk, both for storage (at rest) and transmission (in transit). Asymmetric cryptographic can be used to establish symmetric keys through a key exchange protocol (hybrid encryption) or to provide non-repudiation and authentication by means of a digital signature scheme. While there are many suitable candidates to address the challenges and satisfy security properties required by the applications, a conservative yet efficient choice of algorithms and implementations is plausible to guarantee long-term security in ever-adapting adversarial environments.

Elliptic Curve Cryptography (ECC) is currently the best option for deploying asymmetric cryptography in embedded systems. The discrete logarithm problem underlying ECC has led to fully exponential complexity, thereby allowing much shorter parameters than factorization-based schemes such as RSA. Shorter parameters require lower storage overhead for public keys and substantially accelerates arithmetic.

ECC implementations involve multiple arithmetic layers, specifically finite field arithmetic, elliptic curve arithmetic (group law) and scalar multiplication algorithms. ECC schemes are commonly instantiated on top of either binary or prime fields in which the best trade-off between efficiency and security appears to be prime curves represented in the Edwares model. These benefit from native support for integer arithmetic available in virtually all processors and built-in side-channel resistance properties.

A critical building block for secure and efficient ECC implementations is field arithmetic. The performance-critical operations in this arithmetic layer are the multiplications and squarings required to evaluate doubling and addition formulas for elliptic curve arithmetic. Field arithmetic should utilize the widest multiplication instruction available in an efficient way for any given target platform. It is also common to apply a divide-and-conquer technique, such as Karatsuba, to reduce the quadratic portion of the multiplication and the code size of the multiplier depending upon the size of operands.

The ARM architecture presents a challenge because different processor families support a multitude of multiplication instructions (multipliers). For example, Cortex-M0 processors are limited to 32-bit multipliers that discard the top half of the result (essentially 16-bit multipliers), Cortex-M3/M4/M7 processors have wider 32-bit multipliers and Cortex-A processors equipped with a NEON unit have access to a vectorized multiplier.

The ARM Cortex-M Microcontrollers

The ARM Cortex-M, composed of the Cortex-M0, M0+, M1, M3, M4, and M7, is a set of 32-bit ARM processor cores intended for microcontroller use. These microcontrollers implement load-store architectures optimized for embedded systems in low-power applications. The register file has 16 general purpose registers (r0-r15), although pointer arithmetic is restricted to the lower half.

The Cortex-M processors implement slightly different subsets of the Thumb and Thumb-2 instruction sets. The biggest difference is in the supported multipliers.

Specifically, Cortex-M0/M0+/M1 only has 32-bit multiplier instructions with a lower 32-bit result (essentially a 16-bit multiplier), where the Cortex M3/M4/M7 includes 32-bit multipliers with 64-bit results. An example of such instruction is the Unsigned Multiply Accumulate Accumulate Long (UMAAL) multiplier, which takes between 4 and 7 cycles in Cortex-M3 and a single cycle in Cortex-M4.

With regard to security, the variable-time behavior of the wide multiplier in the Cortex-M3 process complicates side-channel resistant implementations. Early terminations can be used to distinguish point doublings and additions in implementations of scalar multiplication.

This works in protocols which do not fix the point being multiplied, such as ECIES and ECDH. However, laddering schemes should mitigate this effect, since a point doubling and addition is always performed at every step. It is also not clear how to extend the early-terminating multiplier attack to signature schemes.

The present invention utilizes the UMAAL 32-bit multiplication instruction available in all ARM processors starting with the Cortex-M3 and proposes a product-scanning technique with carry delay for performance improvement.

DISCLOSURE OF INVENTION

Technical Problem

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method for performing Elliptic Curve Cryptography (ECC) implemented on multiple arithmetic layers is provided. The method includes performing multi-precision multiplication by implementing product-scanning to process columns of intermediary results in order to obtain a multiplication result by computing unsigned multiplication of data, accumulating a result of the multiplication and preserving a generated carry flag such that propagation of the carry flag is delayed, where performing the multi-precision multiplication includes obtaining a first operand, obtaining a second operand, computing a first column and storing the computed first column, computing a second column and storing the computed second column and accumulating and delaying storage of the generated carry to a third column.

It is contemplated that the method further includes performing an inner multiplication loop inside a multiplication algorithm to scan positions in a result and generating all digit multiplications that contribute to a fixed position.

It is contemplated that each of the digit multiplications is a double-precision result that requires two registers and accumulating and storing the generated carry requires a third register.

It is contemplated that the product-scanning is Comba.

It is contemplated that the product-scanning is a hybrid of Schoolbook and Comba.

It is contemplated that the multi-precision multiplication is performed utilizing an UMAAL instruction.

It is contemplated that the method is performed in an ARM architecture.

In another aspect of the present invention, a method for performing secure communication between devices is provided. The method includes performing Elliptic Curve Cryptography (ECC) of data, the ECC implemented on multiple arithmetic layers and transmitting the encrypted data via a communication channel, where performing the ECC includes performing multi-precision multiplication by implementing product-scanning to process columns of intermediary results in order to obtain a multiplication result by computing unsigned multiplication of data, accumulating a result of the multiplication and preserving a generated carry flag such that propagation of the carry flag is delayed, where performing the multi-precision multiplication includes obtaining a first operand, obtaining a second operand, computing a first column and storing the computed first column, computing a second column and storing the computed second column and accumulating and delaying storage of the generated carry to a third column.

It is contemplated that the method further includes performing an inner multiplication loop inside a multiplication algorithm to scan positions in a result and generating all digit multiplications that contribute to a fixed position.

It is contemplated that each of the digit multiplications is a double-precision result that requires two registers and accumulating and storing the generated carry requires a third register.

It is contemplated that the product-scanning is Comba.

It is contemplated that the product-scanning is a hybrid of Schoolbook and Comba.

It is contemplated that the multi-precision multiplication is performed utilizing an UMAAL instruction.

It is contemplated that the method is performed in an ARM architecture.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Solution to Problem

In one embodiments, A method for performing Elliptic Curve Cryptography (ECC) implemented on multiple arithmetic layers, the method comprising: performing multi-precision multiplication by implementing product-scanning to process columns of intermediary results in order to obtain a multiplication result by computing unsigned multiplication of data, accumulating a result of the multiplication and preserving a generated carry flag such that propagation of the carry flag is delayed, wherein performing the multi-precision multiplication comprises: obtaining a first operand;

obtaining a second operand; computing a first column and storing the computed first column; computing a second column and storing the computed second column; and accumulating and delaying storage of the generated carry to a third column.

In another embodiments, further comprising: performing an inner multiplication loop inside a multiplication algorithm to scan positions in a result; and generating all digit multiplications that contribute to a fixed position.

In another embodiments, wherein: each of the digit multiplications is a double-precision result that requires two registers; and accumulating and storing the generated carry requires a third register.

In another embodiments, wherein the product-scanning comprises Comba.

In another embodiments, wherein the product-scanning comprises a hybrid of Schoolbook and Comba.

In another embodiments, wherein the multi-precision multiplication is performed utilizing an UMAAL instruction.

In another embodiments, wherein the method is performed in an ARM architecture.

In one embodiments, a method for performing secure communication between devices, the method comprising: performing Elliptic Curve Cryptography (ECC) of data, the ECC implemented on multiple arithmetic layers; and transmitting the encrypted data via a communication channel, wherein performing the ECC comprises performing multi-precision multiplication by implementing product-scanning to process columns of intermediary results in order to obtain a multiplication result by computing unsigned multiplication of data, accumulating a result of the multiplication and preserving a generated carry flag such that propagation of the carry flag is delayed, and wherein performing the multi-precision multiplication comprises: obtaining a first operand; obtaining a second operand; computing a first column and storing the computed first column; computing a second column and storing the computed second column; and accumulating and delaying storage of the generated carry to a third column.

In another embodiments, further comprising: performing an inner multiplication loop inside a multiplication algorithm to scan positions in a result; and generating all digit multiplications that contribute to a fixed position.

In another embodiments, wherein: each of the digit multiplications is a double-precision result that requires two registers; and accumulating and storing the generated carry requires a third register.

In another embodiments, wherein the product-scanning comprises Comba.

In another embodiments, wherein the product-scanning comprises a hybrid of Schoolbook and Comba.

In another embodiments, wherein the multi-precision multiplication is performed utilizing an UMAAL instruction.

In another embodiments, wherein the method is performed in an ARM architecture.

BRIEF DESCRIPTION OF DRAWINGS

FIG. 1 illustrates common strategy for implementing multi-precision multiplication in embedded systems;

FIG. 2 illustrates an application of the technique for 3-digit multiplication;

FIG. 3 illustrates code for an application of the technique for 3-digit multiplication;

FIG. 4 illustrates an optimization for an application of the technique for 3-digit multiplication;

FIG. 5 illustrates back applications of optimizations of SBD to multiplication; and FIG. 6 illustrates adaptability of the present invention to Fully Consecutive Operand Caching.

MODE FOR THE INVENTION

FIG. 1 illustrates a common strategy for implementing multi-precision multiplication in embedded systems, specifically utilizing a product-scanning technique also called Comba. The main loop inside the multiplication algorithm in this approach scans the positions in the result and computes all the digit multiplications that contribute to a certain fixed position.

Each digit multiplication requires two registers, or a double-precision result, such that a three-register window is utilized for accumulation and carry propagation and memory operations for reloading intermediary results are saved. There are many different ways to schedule the instructions required for implementing product-scanning, such as a hybrid method combining Schoolbook and Comba and an operand-caching method. FIG. 1 illustrates the order used by product-scanning to process columns of intermediary results in order to obtain the multiplication result.

The Unsigned Multiply Accumulate Accumulate Long (UMAAL) instruction is among the most efficient multipliers available in the ARM architecture. The UMAAL instruction computes the unsigned multiplication of two registers and accumulates the result in another two registers while preserving the carry flag. This requires carefully scheduling instructions and registers in order to avoid losing carries.

FIG. 2 illustrates an application of the technique for 3-digit multiplication. The left portion of FIG. 2 illustrates the usual implementation for accumulating a two-digit multiplication result into a three-register widow. The right portion of FIG. 2 illustrates elimination of carry propagation and delay of the carry to the next column.

FIG. 3 illustrates code for an application of the technique for 3-digit multiplication.

A first optimization illustrated in FIG. 4 switches out the multiplication algorithm from Karatsuba to Hutter and Wegner's Operand Caching in a variation of COMBA's multiplication algorithm. This avoids excessive memory accesses to reload operands and saves about 200 CPU cycles on a M4 processor.

Two specific curves, Curve25519 and Ed448-Goldilocks, are targeted. The first curve is Curve25519, specifically Montgomery curve over F2255-19. The second curve is Curve448, specifically Edwards curve over F2448-2444-1.

Keys are 256 bits and 448 bits in size such that security levels are established at, respectively, 128 bits and 224 bits. Primes are chosen as close as possible to a power of 2 for efficiency reasons for DJB. For Hamburg, 32-bit aligned coefficients helps full radix implementation and reduces carry values and is adaptable to Karatsuba.

For Curve25519 field arithmetic, the X25519 function is utilized on ECDH and is a Montogomery ladder scalar multiplication on the curve. Therefore, any speedups of field operations facilitates speeding up everything. COC's memory accesses (LDRs and STR) can be pipelined in order to save even more cycles.

Sliding Block Doubling (SBD), which is another variation of COMBA's algorithm, is utilized for the Squaring operation. COMBA's algorithm is better than Karatsuba for multiplication. Therefore, the same algorithm could be more efficient than the current one based on Karatsuba. Furthermore, all optimizations of SBD, at least with regard to Column Scanning, can be back applied to the multiplication implementation, as illustrated in FIG. 5.

Multiplication could be performed using the UMAAL instruction without touching the carry bit. Furthermore, $(2^{31}-1) \times (2^{31}-1) + (2^{31}-1) + (2^{31}-1)$ does NOT need an extra bit (carry) to store the result. Basic column calculation is now limited only to UMAAL instructions with very few MOVs aside from memory accesses.

The present invention provides an efficient implementation of product-scanning by delaying carry propagation at the end of each column to the start of a new column, thereby saving instructions. The reduced number of executed operations provide a linear performance improvement in addition to careful scheduling of instructions in the Cortex-M3 and M4 processors where both additions and multiplications take a single cycle. Specifically, with regard to multiplication of "n" digits, the present invention saves "2n" addition instructions (in terms of latency, energy and code size) with similar performance improvements for the squaring of an "n"-digit integer.

The present invention provides more efficient Public-key Cryptography in comparison to DLP over prime field-based algorithms and is adaptable to Internet of Things (IoT) devices. Smaller key sizes result in savings that make ECC attractive for constrained environments with regard to RFC4492. The present invention is widely supported across the web, specifically Mozilla Firefox, Google Chrome(ium), and OpenSSL.

The present invention features complete arithmetic formulae, safe twists, constant time and efficient scalar multiplication operation. The present invention is designed toward simple constant time implementations, Key Exchange (Elliptic Curve Diffie-Hellman) standardized in RFC7748, signatures (Edwards-Curve Digital Signature Algorithm) standardized in RFC8032 and TLS use.

The present invention provides a new implementation of multiplication and squaring algorithms over the F2255-19 field using the Multiply-Accumulate-Accumulate instruction with improvements over previous algorithms. The present invention achieves approximately 30% speedup on ECDH over Curve25519 in comparison to public state-of-art work on the ARM Cortex-M4 processor. Portable, un-optimized code is available for Ed448-Goldilocks. The present invention utilizes a Karatsuba "divide and conquer" approach in order to improve cycle count on multiplication over F448 and determine the best 256-bit operations.

Since Carry Catcher and Carry Delaying optimizations are already present to avoid losing the carry bit during UMAAL and ADD/ADC(S) sequences, the present invention may be applicable to using the UMAAL instruction to reduce ADD instructions and possible carries between the calculation of partial columns.

The present invention is also adaptable to Fully Consecutive Operand Caching in order to achieve smarter operand loading and caching of operands to reduce memory accesses as illustrated in FIG. 6. During SPEED-B, some non-existent carry operations are eliminated since the (231-1)×(231-1)+bit does not generate an extra carry bit.

With the present invention, basic column calculation is now limited only to UMAAL instructions with very few MOVs aside from memory accesses. Furthermore, memory accesses phases in the SBD algorithm may be reduced from three to two. Moreover, Operand Caching's binit block allows reduction of extra memory access such that only one read is required for most operands and one write to memory is required for each part of most portions of the final result.

The multiplication and squaring operations over F2255-19 of the present invention further reduces X25519 (kP operation) to less than 1 M cycles while requiring a few more bytes. Code size is still competitive against state of art and timing is even more competitive in comparison to other curves implementations of similar security levels.

The present invention facilitates writing a new select (conditional move) procedure using the SEL instruction in order to further reduce the attack surface against a power analysis attack, specifically from 32 bits set in a register to 8 bits. Furthermore, X25519 portable code is now available and integrated into codebase with completely different algorithms with 10×25.5 bits (25/26 bits representation) as opposed to ARM code, which uses dense limbs representation (8×32 bits).

The present invention facilitates moving up to Ed448-Goldilocks using engineering tricks to reuse 25519's code. The present invention further speeds up Ed25519 operations, specifically fixed point multiplication with Hamburg's Signed Comb+precomputed points in Neils format and dual-point multiplication with standard wNAF interleaving for dual point.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for improving performance of a computer processor in performing Elliptic Curve Cryptography (ECC), the method providing for a reduced number of operations executed in the computer processor, the method comprising:

performing multi-precision multiplication in the computer processor for ECC implemented on multiple arithmetic layers, wherein performing the multi-precision multiplication comprises:

obtaining a first operand for a product-scanning multiplication operation to be performed over at least a first column, a second column, and a third column;

obtaining a second operand for the product-scanning multiplication operation to be performed over at least the first column, the second column, and the third column;

computing a first intermediary multiplication result for the first column in accordance with the product-scanning multiplication operation and storing the computed first intermediary result;

computing a second intermediary multiplication result for the second column in accordance with the product-scanning multiplication operation and storing the computed second intermediary result;

accumulating the first and second intermediary multiplication results for the first and second columns; and preserving a generated carry flag such that propagation of a generated carry value to the third column is delayed.

2. The method of claim 1, further comprising:

performing an inner multiplication loop inside a multiplication algorithm to scan positions in a result; and generating all digit multiplications that contribute to a fixed position.

3. The method of claim 2, wherein:

each of the digit multiplications is a double-precision result that requires two registers; and accumulating and preserving the generated carry flag require a third register.

4. The method of claim 1, wherein the product-scanning comprises Comba.

5. The method of claim 1, wherein the product-scanning comprises a hybrid of Schoolbook and Comba.

6. The method of claim 1, wherein the multi-precision multiplication is performed utilizing an Unsigned Multiply Accumulate Accumulate Long (UMAAL) instruction.

7. The method of claim 1, wherein the method is performed in an Advanced RISC Machine (ARM) architecture.

8. A method for performing secure communication between devices, the method comprising:

performing Elliptic Curve Cryptography (ECC) of data, the ECC implemented on multiple arithmetic layers to generate encrypted data; and transmitting the encrypted data via a communication channel, wherein performing the ECC comprises performing multi-precision multiplication, wherein performing the multi-precision multiplication comprises:

obtaining a first operand for a product-scanning multiplication operation to be performed over at least a first column, a second column, and a third column;

obtaining a second operand for the product-scanning multiplication operation to be performed over at least the first column, the second column, and the third column;

computing a first intermediary multiplication result for the first column in accordance with the product-scanning multiplication operation and storing the computed first intermediary result;

computing a second intermediary multiplication result for the second column and storing the computed second intermediary result;

accumulating the first and second intermediary multiplication results for the first and second columns; and preserving a generated carry flag such that propagation of generated carry value to the third column is delayed.

9. The method of claim 8, further comprising:

performing an inner multiplication loop inside a multiplication algorithm to scan positions in a result; and generating all digit multiplications that contribute to a fixed position.

10. The method of claim 9, wherein:

each of the digit multiplications is a double-precision result that requires two registers; and accumulating and preserving the generated carry flag require a third register.

11. The method of claim 8, wherein the product-scanning comprises Comba.

12. The method of claim 8, wherein the product-scanning comprises a hybrid of Schoolbook and Comba.

13. The method of claim 8, wherein the multi-precision multiplication is performed utilizing an Unsigned Multiply Accumulate Accumulate Long (UMAAL) instruction.

14. The method of claim 8, wherein the method is performed in an Advanced RISC Machine (ARM) architecture.

* * * * *